United States Patent
Bryant et al.

(10) Patent No.: US 8,429,218 B2
(45) Date of Patent: Apr. 23, 2013

(54) PROCESS RESTART ON A COMPUTE NODE

(75) Inventors: Jay S. Bryant, Rochester, MN (US); Daniel P. Kolz, Rochester, MN (US); Dharmesh J. Patel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1789 days.

(21) Appl. No.: 11/278,829

(22) Filed: Apr. 6, 2006

(65) Prior Publication Data
US 2007/0239851 A1 Oct. 11, 2007

(51) Int. Cl.
*G06F 15/16* (2006.01)
*G06F 9/46* (2006.01)
*H04L 12/28* (2006.01)

(52) U.S. Cl.
USPC ............................ 709/201; 718/102; 370/389

(58) Field of Classification Search .................. 718/102; 370/389
See application file for complete search history.

(56) References Cited

U.S. PATENT DOCUMENTS

| | | | | |
|---|---|---|---|---|
| 6,105,053 | A * | 8/2000 | Kimmel et al. | 718/105 |
| 6,182,130 | B1 * | 1/2001 | Dolin et al. | 709/221 |
| 6,925,642 | B1 * | 8/2005 | Commander | 718/104 |
| 7,143,412 | B2 * | 11/2006 | Koenen | 718/102 |
| 7,162,720 | B2 * | 1/2007 | Jones et al. | 718/107 |
| 7,356,026 | B2 * | 4/2008 | Scott et al. | 370/389 |
| 2006/0080389 | A1 * | 4/2006 | Powers et al. | 709/203 |
| 2006/0143350 | A1 * | 6/2006 | Miloushev et al. | 710/242 |

* cited by examiner

*Primary Examiner* — Ranodhi Serrao
(74) *Attorney, Agent, or Firm* — Patterson & Sheridan LLP

(57) ABSTRACT

Embodiments of the present invention provide a method for reducing load time of a program in a highly-parallelized or distributed computer. In one embodiment, this is accomplished by selectively reusing entries in a page table generated during a previous invocation of the program at a particular compute node of the highly-parallelized or distributed computer system.

8 Claims, 6 Drawing Sheets

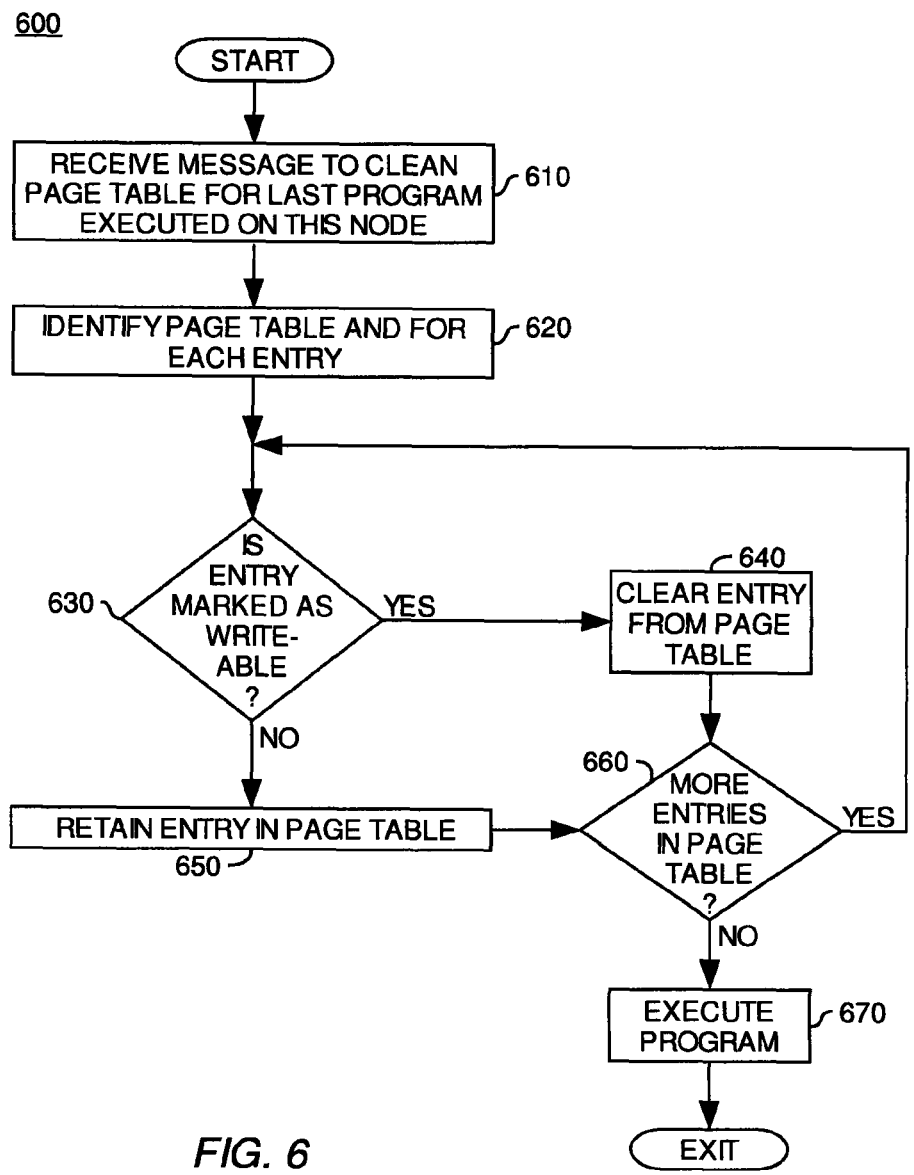

PROCESS RESTART ON A COMPUTE NODE

BACKGROUND OF THE INVENTION

1. Field of the Invention

The present invention generally relates to computer systems and development. More specifically, the present invention relates to a process for reducing the time required to load a program for execution in a distributed or highly parallelized computer system.

2. Description of the Related Art

Supercomputer systems continue to be developed to tackle increasingly complex computing problems. These systems have proved to be particularly useful for a broad variety of applications including, life sciences, financial modeling, hydrodynamics, quantum chemistry, molecular dynamics, astronomy, weather modeling and prediction, and geological modeling. Super computer developers have focused on massively parallel computer architectures to provide ever-increasing amounts of computational power to apply to these, and other, applications.

One family of massively parallel systems has been (and continues to be) developed by International Business Machines (IBM) under the name blue gene. The blue gene/L system is a scalable that may be configured with a maximum of 65,536 ($2^{16}$) compute nodes. Each blue gene/L node includes a single application specific integrated circuit (ASIC) with 2 CPU's and memory. The blue gene architecture has been extremely successful and on Oct. 27, 2005, IBM announced that a blue gene/L system had reached an operational speed of 280.6 teraflops (280.6 trillion floating-point operations per second), making it the fastest computer in the world at the time. Further, as of June 2005, blue gene/L installations at various sites world-wide were among 5 out of the 10 top most powerful computers in the world.

IBM is currently developing a successor to the blue gene/L system, named blue gene/P. Blue gene/P is expected to be the first computer system to operate at a sustained 1 petaflops (1 quadrillion floating-point operations per second). Like the blue gene/L system, the blue gene/P system is a scalable system with a projected maximum of 73,728 compute nodes. Each blue gene/P node includes a single application specific integrated circuit (ASIC) with 4 CPU's and memory. A complete blue gene/P system would be housed in 72 racks or cabinets, each with 32 node boards (with 32 nodes per board).

In addition to the blue gene architecture developed by IBM, other distributed computer systems may have a similar overall architecture as a massively parallel computer system. Examples of other distributed systems include clustered systems and grid based systems. For example, a Beowulf cluster is a group of computer systems each running a Unix-like operating system, such as the Linux® or BSD operating systems. The computer systems of the collection are connected over high speed networks into a small TCP/IP LAN, and have libraries and programs installed which allow processing to be shared among the nodes.

In performing many of the applications described above, super computer systems are used to solve a variety of problems that often involve performing essentially the same calculations for different data sets. Examples of this type of application include modeling of molecular interactions such as simulating the folding of an individual protein. For these types of applications, a relatively small amount of data is used by a program executing on any given node. The program will then make many calculations involving this data. When finished, the results of the calculations are returned. Because thousands of nodes are performing the same calculations (on different data sets), extremely large datasets may be processed in a relatively short period of time.

Given the number of nodes in either a highly parallelized super computer, such as a blue gene system or in other distributed systems, operations that require even small amounts of overhead for any individual node often translate into large amounts of time for the system as a whole. For example, the collective time required to load a program by individual compute nodes can be significant. Thus, collectively, a substantial amount of time may be expended simply transmitting a program to a compute node. The same phenomenon occurs in distributed systems where datasets, programs and the like must be transmitted to processing nodes that are part of the distributed system. Accordingly, there is a need in the art for techniques that will reduce the load time of a program in highly-parallelized or distributed computer systems.

SUMMARY OF THE INVENTION

The present invention generally provides a method for reducing the time required to load a program in a highly-parallelized or distributed computer system. One embodiment of the invention provides a method for loading a program on a computing system that includes multiple processing nodes. The method generally includes identifying, if available, a plurality of processing nodes that previously executed the program, wherein the program is associated with a computing job submitted for execution by the computing system. The method generally further includes messaging each identified processing node to retain a page table associated with the previous execution of the program, and dispatching the computing job to the plurality of processing nodes.

Another embodiment of the invention includes a computer-readable medium containing a program which, when executed, performs an operation for loading a program on a computing system that includes multiple processing nodes. The operations generally include, identifying, if available, a plurality of processing nodes that previously executed the program, wherein the program is associated with a computing job submitted for execution by the computing system. The operations generally further include, messaging each identified processing node to retain a page table associated with the previous execution of the program and dispatching the computing job to the plurality of processing nodes.

Still another embodiment of the invention includes a parallel computing system. The system generally includes a plurality of compute nodes and a control system configured to execute a computing job on at least some of the plurality of compute nodes by performing a set of operations. The operations may generally include identifying, if available, a plurality of processing nodes that previously executed the program, wherein the computing job identifies a program to be executed on the parallel computing system. The operations may generally further include messaging at least some of the set of compute nodes to retain a page table associated with the previous execution of the program and dispatching the computing job to at least some of the compute nodes included in the set of compute nodes.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof, which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is a block diagram of a compute node state table maintained by a service node, according to one embodiment of the invention.

FIG. 6 is a flow diagram illustrating a method for a compute node of a highly-parallelized or distributed computer system to perform a computing job, according to one embodiment of the invention.

DETAILED DESCRIPTION OF THE PREFERRED EMBODIMENTS

Figure 1:
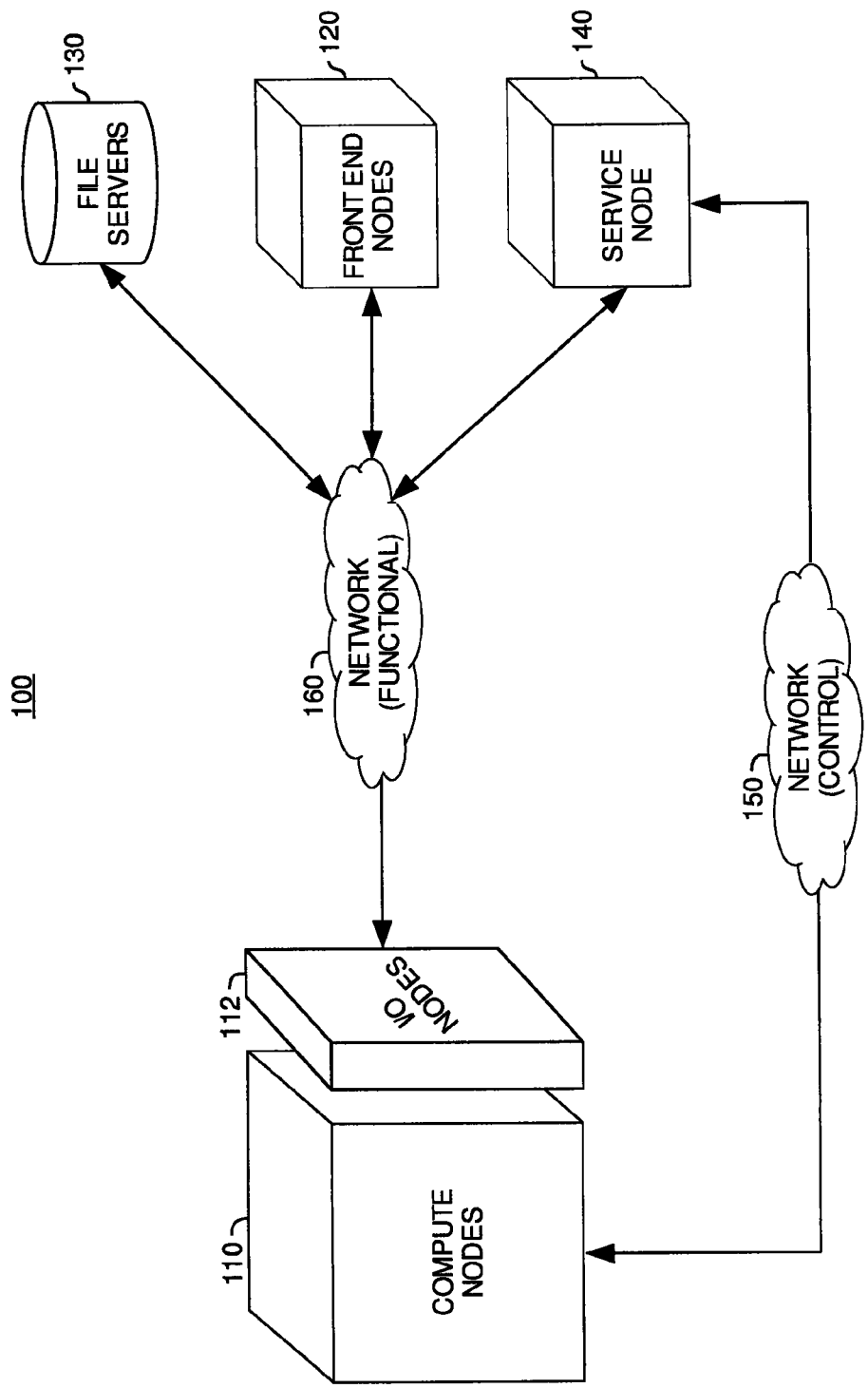
FIG. 1 is a block diagram illustrating a massively parallel computer system, according to one embodiment of the invention.

Embodiments of the present invention provide a method for reducing load time of a program in a highly-parallelized or distributed computer. This is accomplished by reusing, where possible, information loaded by a previous invocation of the program at a particular compute node of the highly-parallelized or distributed computer system. Since some segments of data transmitted to compute node(s) when a job is dispatched for execution are the binary instructions of the program, which are immutable in memory, pages of memory can be saved from previous invocations of the same program. Thus, embodiments of the invention avoid page faults that would otherwise occur each time a control system dispatches a job to a particular compute node. At the same time, a given compute node need not wait for binary instructions to be paged into memory when instructed to begin executing a particular job.

Embodiments of the invention are described herein with respect to the blue gene computer architecture developed by IBM. Embodiments described herein are particularly advantageous for massively parallel computer systems that include thousands of processing nodes, such as a blue gene system. However, embodiments of the invention may be adapted for use in a variety of parallel computer systems that employ multiple CPUs arranged to communicate over a network. For example, embodiments are may be readily adapted for use in distributed architectures such as clusters or grids, in such architectures, each processing node may be a computer system communication with others over local, regional, or global networks.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the computing environment 100 FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a highly parallel computer system 100, according to one embodiment of the invention. In particular, computer system 100 illustrates a high-level diagram of a blue gene system. As shown, the computer system 100 includes a collection of compute nodes 110 and a collection of input/output (I/O) nodes 112. The compute nodes 110 provide the computational power of the computer system 100. In one embodiment, each compute node 110 includes one or more CPUs. Additionally, each compute node 110 may include a memory used to store both program instructions and data sets on which the instructions are performed.

In one embodiment, a compute node 110 may be configured to reuse a page table associated with a program executed on the compute node 110 for multiple invocations of the same program. As is known, a page table provides an index of pages and their physical and logical addresses. The reuse of program page tables is described in greater detail below.

The I/O nodes 112 may provide a physical interface between the compute nodes 110 and file servers 130 over functional network 160. In one embodiment, the compute nodes 110 and I/O nodes 112 communicate with file servers 130, front end nodes 120 and service node 140 over both a control network 150 and/or a functional network 160. In a blue gene system, the I/O nodes 112 and compute nodes 110 may differ from one another only by which network interfaces are enabled and how the node is used by the system 100. The I/O nodes 112 may also be configured to execute processes that facilitate the control, booting, job launch and debug of the computing system 100. This helps simplify an operating system kernel running on each compute node 110, as each compute node 110 need only communicate with a few I/O nodes 112. The front end nodes 120 store compilers and other applications used by users interacting with the system 100. Typically, users access front end nodes 120, submit programs for compiling, and submit jobs to the service node 140.

The service node 140 may include a system database and all the administrative tools provided by the system 100. Typically, the service node 140 includes a computing system configured to handle scheduling and loading of software programs and data on the compute nodes 110. In one embodiment, the service node may be configured to assemble a group of compute nodes 110 (referred to as a block), and dispatch a job to a block for execution. The service node 140 is typically a computer system that includes an operating system, memory, storage, and control console (not shown). For example, the blue gene/P system uses a computer system running the Linux® operating system. The service node 140 communicates with the compute nodes 110 over control network 150. The control network 150 provides a communication channel for the service node 140 to control aspects of the operation of system 100.

Figure 2:
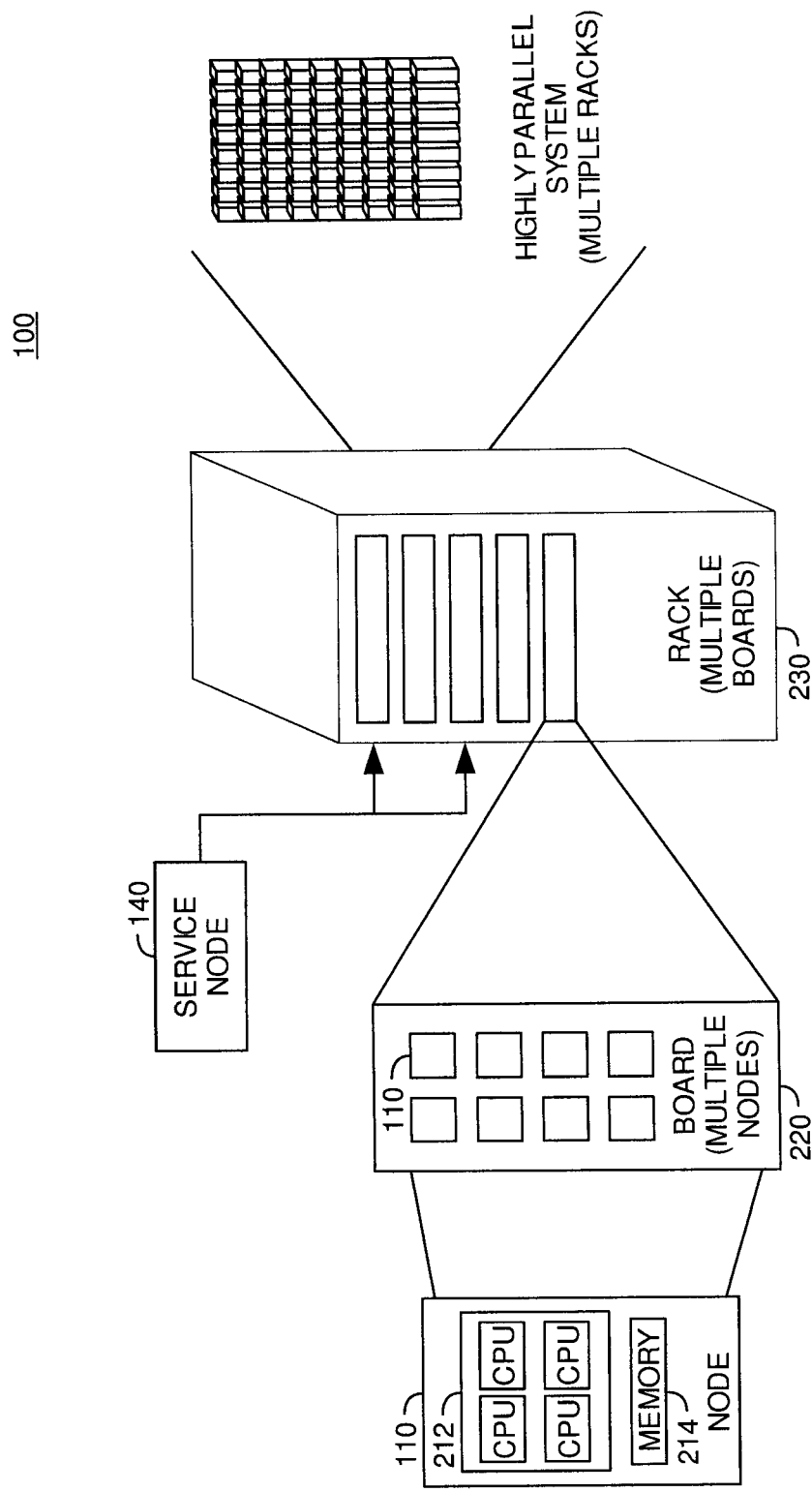
FIG. 2 is a block diagram that further illustrates aspects of a massively parallel computer system, according to one embodiment of the invention.

FIG. 2 is a block diagram further illustrating aspects of a massively parallel computer system, according to one embodiment of the invention. In particular, FIG. 2 shows a block diagram that illustrates aspects of the blue gene/P computer system. As stated above, the blue gene/P is a scalable system with a projected maximum of 73,728 compute nodes 110. In a blue gene/P system, each compute node 110 is packaged on a node card and consists of a single application specified integrated circuit (ASIC) 212 with four CPUs and memory 214. A node board 220 accommodates 32 node cards, each having a node 110. Thus, each node board has 32 nodes, with 4 CPUs per node 110 and memory 214. A rack 230 is a housing that holds 32 node boards 220. A complete blue gene/P system would be housed in 72 racks 130 with 32 node boards 220 in each rack. Thus, a complete blue gene/P system would have a maximum of 294,912 CPUs (72 racks× 32 node boards×32 nodes×4 CPUs).

The blue gene/P computer system includes multiple data communication networks. An I/O processor located on some node boards 220 process data communication between service node 140 and a group of compute nodes 110. In one embodiment, each I/O node 112 manages data communications over functional network 160 for as many as 1024 compute nodes 110. In a blue gene/P system, the 73,728 compute nodes 110 and 1024 I/O nodes are configured to communicate over both a logical tree network and a torus network. The torus network connects the compute nodes 110 in a lattice like structure that allows each compute node 110 to communicate directly with its six nearest neighbors. Nodes 110 may communicate over the torus network using the well known Message Passing Interface (MPI), an application programming interface used in developing applications for a highly parallel or cluster computer system (e.g., system 100). Any one compute node 110 may route messages to another compute node 110 over the torus network.

Figure 3:
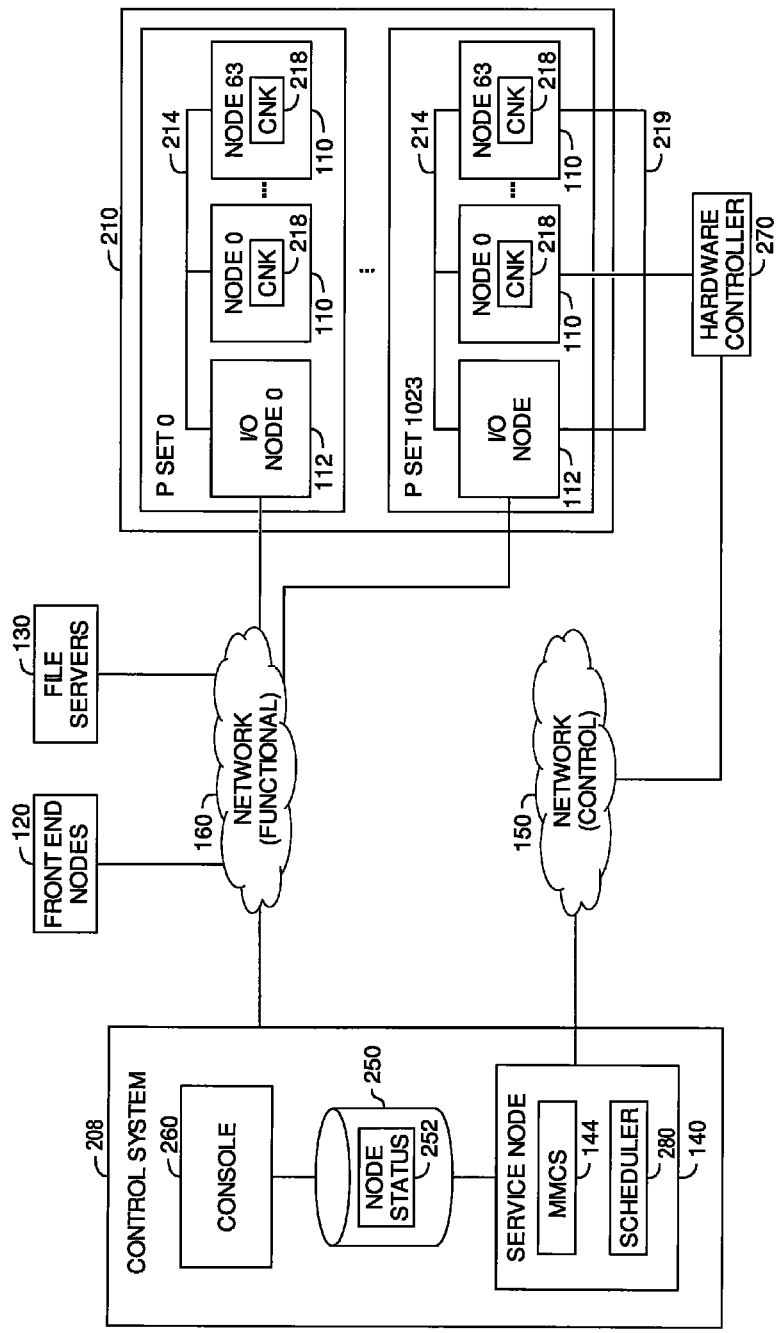
FIG. 3 is a block diagram that further illustrates aspects of a massively parallel computer system, according to one embodiment of the invention.

FIG. 3 is a block diagram that further illustrates aspects of a massively parallel computer system, according to one embodiment of the invention. In particular, FIG. 3 further illustrates a view of the system architecture of a blue gene/P computer system. FIG. 3 includes a representation of all the compute nodes 110 of the computer system 100 shown a as compute core 210 connected to the control system 208. The compute core 210 communicates with the service node 140 of control system 208 over control system network 150. The compute core 210 is connected to the control system network 150 through a hardware controller 270 that connects each I/O node 112 with a set of compute nodes 110.

The computer system 100 may be described as a compute node core 210 with an I/O node surface where communication to 1024 compute nodes 110 is managed by the same I/O node 112. In a blue gene system, the I/O nodes 112 are connected to the compute nodes 110 through the tree network 214 and also have functional wide area network capabilities through a gigabit Ethernet network (e.g. network 160).

In one embodiment, the hardware controller 270 communicates with the compute nodes 110 using JTAG network 219. As is known, JTAG is a low level communication protocol that may be used to initialize the compute nodes and prepare them to have system images loaded. The JTAG network may also be used to perform a variety of other low level monitoring and support functions. A hardware controller 270 resides in each rack 230 and provides an interface for the control system 208 to configure the compute nodes 110 and load program instructions and data into the memory 214 of a compute node. In the Blue gene/P computer system the packaging of each node board and midplane includes an IDo chip. The IDo chips are 25 MHz FPGAs that receive commands from the service node using UDP packets sent over the JTAG network 219.

Further, as shown in FIG. 3, the compute core 210 also communicates with file servers 130 and front end nodes 120 over functional network 160. The functional network 160 may be a gigabit Ethernet. The file servers 130 store data for user applications and system images. Individual compute nodes access the file servers by communicating with an I/O node 112. For example, the compute node may have access to the file servers 130 over an NFS share. In one embodiment, the control system 208 includes a database 250 configured to hold data tables that specify status information associated with the compute nodes 110. The mid-plane management and control system (MMCS) 144 may be configured to manage the allocation of hardware in a compute core 210 to different computing jobs. The control system 208 is also connected to functional network 160. In one embodiment, this connection allows the control system 208 to detect when a compute node 110 has completed the boot process after being loaded with a system image and data files. The control system 208 further includes a console 260 for use by users and system administrators.

Again referring to FIG. 3, the compute core 210 illustrates the compute nodes 110 housed in racks 230. In a blue gene system, the compute nodes are grouped into processing sets (psets). A pset is a group of 64 nodes grouped together in a set for communication with a particular I/O node 112. In one embodiment, the compute core 210 may be partitioned into a maximum a number of psets, each with one I/O node 112 running a Linux® operating system kernel, and 64 compute nodes 110 running a compute node kernel (CNK) transmitted as a system image over control network 150. As described, the I/O node 112 provides communication over the functional network 160 for the compute nodes in a given pset. In a blue gene/P system, an I/O node 112 may be configured to communicate with between 8 and 128 compute nodes.

Each compute node 110 includes system image and data files 218 stored in the memory 214 of a compute node 110. The system image files and compute node kernel (CNK) 218 include system files such as the operating system kernel. The compute node kernel 218 is stored in the memory 214 of each compute node 110. The system image files are typically loaded and the compute node kernel 218 typically begins executing before the compute node 110 is instructed to perform any user applications.

To execute a computing job on the computer system 100, a request is made to the service node 140 to allocate a collection of compute nodes 110 into a block to run job. As the compute nodes 110 may not include any local persistent storage such as a hard disk drive, the compute nodes 110 must be loaded with the proper software in order to run the job. In one embodiment, the user specifies the characteristics of a desired partition to execute a job. The scheduler 280 selects a set of compute nodes 110 to form a block used to execute the job. Once selected, the compute nodes 110 (and corresponding I/O nodes 112) selected by the scheduler 280 are configured into a block by the service node 140 using the control network 150. Once a block is created, a job may be dispatched through the control system 208 in communication with the I/O nodes 112 over networks 150 and/or 160.

In one embodiment, the service node 140 uses database 250 and node status table 252 to maintain a table of what was the last program invoked on each compute node 110. When a user invokes a job, the control system 208 determines whether any compute nodes 110 are currently available that last ran the same program being dispatched. If compute nodes 110 are available, then the control system 208 instructs such compute nodes 110 to retain the page table associated with the program identified in a job request. All of page tables except one associated with the program being dispatched are discarded by the compute node. Additionally, entries from the retained page table that are marked as invalid or writable may be removed from the retained page table. The memory space of the process last to run the program being dispatched has now been cleansed of any data that the previous execution of the program created or modified. At the same time, pages marked as read only or as executable have been retained, and will not need to be loaded or cause a page fault (a page fault is an exception which is raised by the memory management unit when a needed page is not mapped in physical memory) when the job being dispatched is executed by the compute node 110.

The program is now dispatched to the compute nodes 110. The control system 208 instructs the compute nodes 110 to use the retained page table instead of creating a new one for the process being dispatched. Any other processes that are part of the computing job start with clean memory spaces, and pages may be brought into memory using the functional network and I/O nodes 112 using a demand paging process. When the program begins executing, it tries to load the first instruction from a location in memory. Normally, this would trigger a page fault. This exception is passed on to the operating system which, in response, loads the required page into physical memory from some secondary storage source. However, because information from the retained page table contains a valid mapping, the program has ready access to the information binary instruction. This will happen for all of the instructions for the program. Thus, the load time of the application associated with the retained page table may be substantially reduced. This is particularly the case for a massively parallel system, such as a blue gene system, that may dispatch the same job with different data sets thousands, millions, or even billions of times.

FIG. 4 is a block diagram of a compute node status table 252 maintained by a service node 140, according to one embodiment of the invention. In one embodiment, the node status table 252 may be stored as part of database 250. As shown, node status table 252 includes a list of the compute nodes 110 that are part of a given system matched with the last job executed on each node. Thus, when a user dispatches a job request, the control system 208 may use the node status table 252 to identify nodes that previously executed a job being dispatched.

Figure 5:
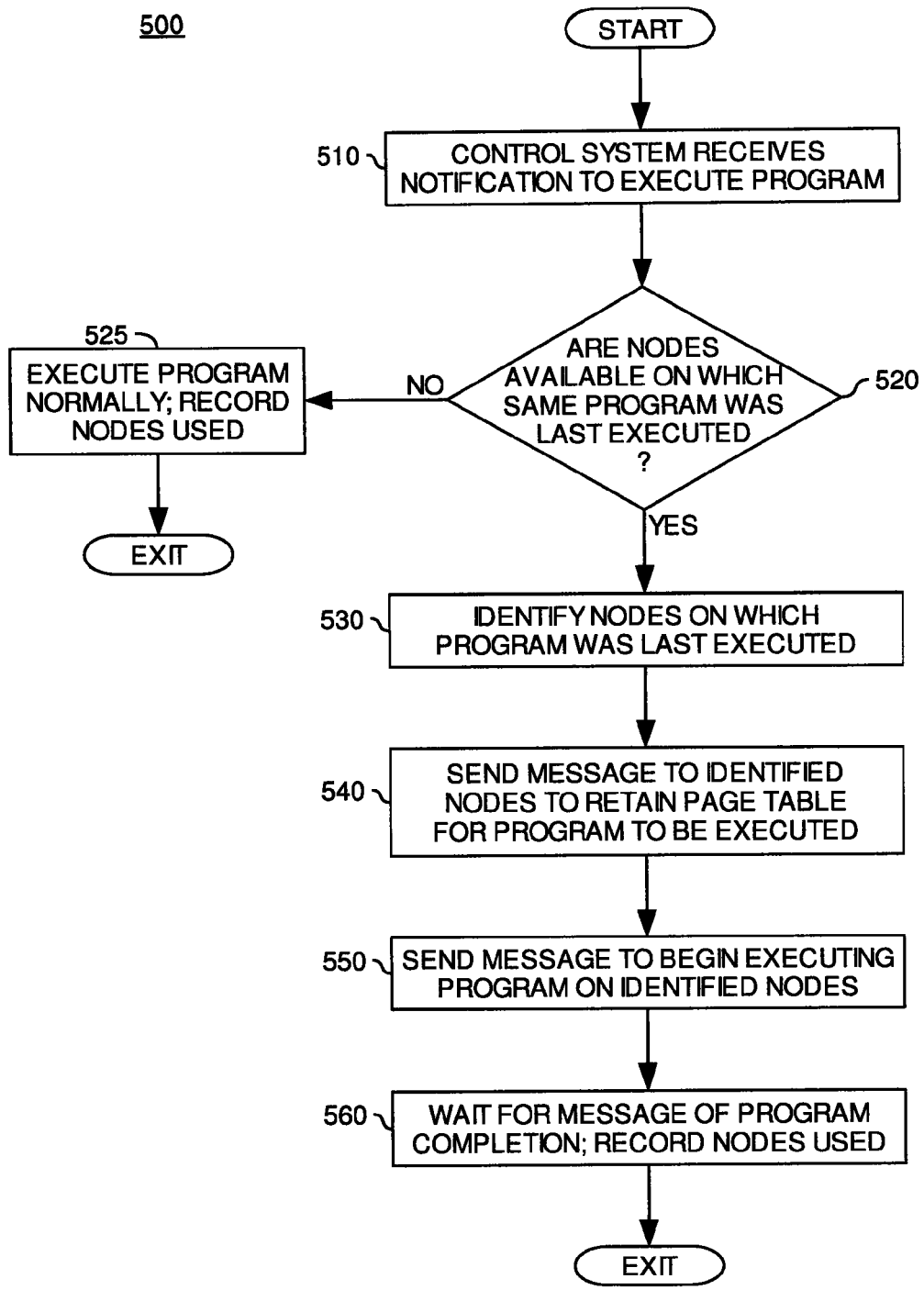
FIG. 5 is a flow diagram illustrating a method for preparing a set of compute nodes to execute a computing job on a highly-parallelized or distributed computer system, according to one embodiment of the invention.

FIG. 5 is a flow diagram illustrating a method 500 for preparing a set of compute nodes 110 to execute a computing job on a highly-parallelized or distributed computer system, according to one embodiment of the invention. The method 500 begins at step 510 where the control system 208 receives a job description to dispatch to the computing core 210. In one embodiment, the job description may specify what application program to execute, the desired performance characteristics, such as the number of compute nodes 110 to use executing the job or the desired estimated time to complete the job, and the job description may further include the data sets associated with a given job.

At step 520, the control system 208 may determine whether compute nodes 110 are available which last executed the application program specified in the job description. It not, then at step 525 the control system 208 schedules and dispatches the job to the compute core 210. Additionally, once the compute nodes 110 complete processing the job, the control system 208 may record which compute nodes 110 were used to perform the job in node status table 252.

Otherwise, if compute nodes 110 are available that last executed an application program specified by the job description then at step 530, the control system 208 identifies a set of compute nodes on which the application program was last executed. At step 540, the control system 208 sends a message to the identified compute nodes 110 to retain the page table for the application program specified in the job description. In one embodiment, the control system communicates with the affected compute nodes 110 over control network 270. FIG. 6, described below, illustrates actions performed by the compute nodes 110 in response to receiving a message to retain the page table for the application program.

At step 550, the job is dispatched to the compute nodes for execution. Once the compute nodes 110 complete executing the job, at step 560, the control system 208 may record which compute nodes 110 were used to perform the job in node status table 252.

FIG. 6 is a flow diagram illustrating a method 600 for a node of a parallelized or distributed computer system to perform a computing job, according to one embodiment of the invention. The method 600 begins at step 610 where a compute node 110 receives a message from the control system 208 over control network 150 to retain the page table from a prior invocation of the same application. At step 620, the compute node 110 identifies the page table associated with the user application. Thereafter, a loop begins that includes steps 630-660. During each pass through the loop, the compute node 110 determines whether to retain or discard an entry from the page table associated with the application. At step 630, the compute node 110 determines whether a page under consideration is marked as writeable. If so, the page is cleared from the page table and discarded from memory at step 640. Otherwise, at step 650, if the entry in the page table is not marked as writeable, then the compute node 110 retains the page table entry for use during a subsequent invocation of the application program associated with the page table. Conversely, at steps 630, the compute node 110 may determine whether an entry in the page table is marked as read only (i.e., as executable) and retain or discard the page accordingly. After either discarding or retaining the page table entry under consideration, at step 660, the compute node 110 determines whether more page table entries need to be evaluated. If so, the compute node 110 returns to step 630 and evaluates another page table entry.

Otherwise, at step 660, once all of the entries in the page table have been evaluated, the compute node 110 may begin executing the application program using the modified page table from the prior invocation of the same application program. As a result, reentrant pages (i.e., pages that include only executable instructions) remain valid in the page table and do not have to be brought into the physical memory of the compute node in order to load the program.

Figure 7A:
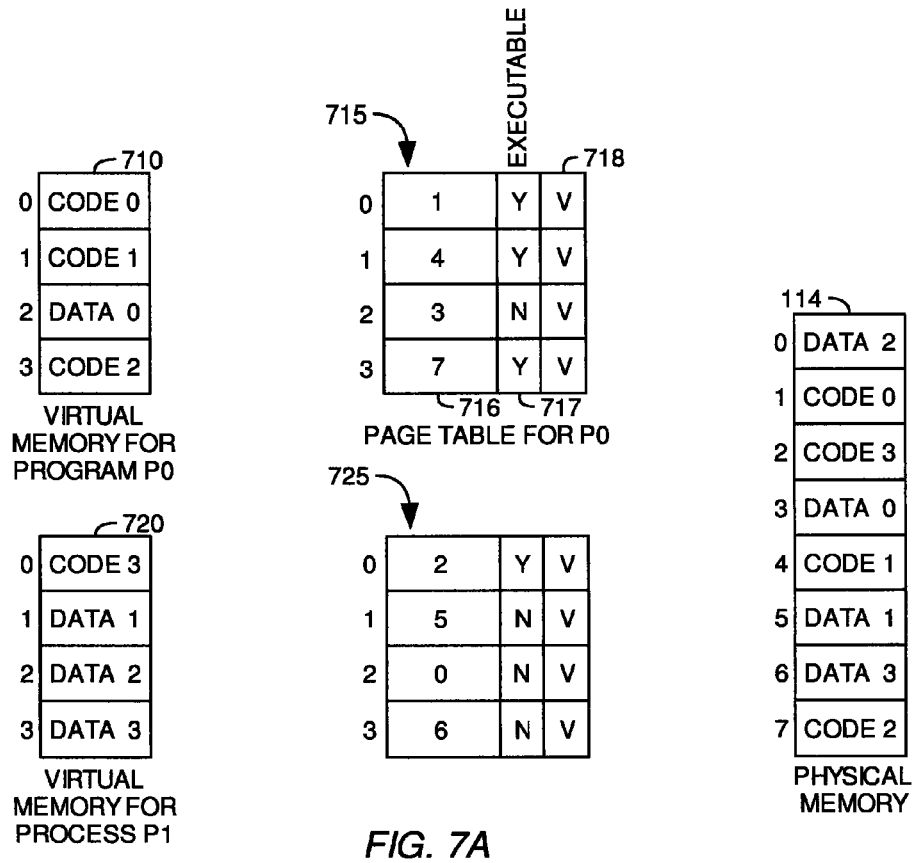
FIG. 7A-7B illustrate a page table maintained by a computing node of a highly-parallelized or distributed computer system, according to one embodiment of the invention.
Figure 7B:
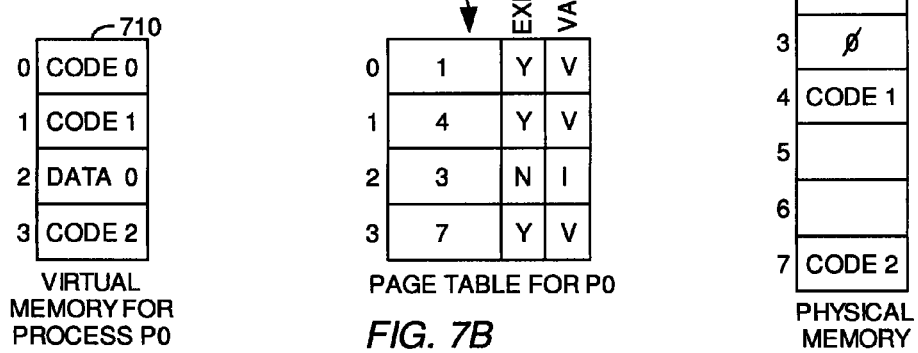

FIGS. 7A and 7B illustrate a page table maintained by a computing node 110 of a highly-parallelized or distributed computer system, according to one embodiment of the invention. As shown, FIG. 7A represents the state of a compute node 110 after two user applications (labeled as $P_0$ and $P_1$) have completed execution. Virtual memory table 710 shows 4 pages (page 0, 1, 2, and 3) used by process $P_0$. The process $P_0$ includes three pages of executable instructions (pages 0, 1, and 3) and a single page (page 2) marked as not being executable (i.e. as writeable data). Page table 715 maps the virtual memory address used by process $P_0$ into address in physical memory 730. Specifically, pages 0, 1, 2, and 3 are mapped into pages 1, 4, 3, and 7, respectively, of physical memory 730. As shown, page table 715 includes a column 716 showing the mapping from a virtual page located to the physical memory 730, a column 717 indicating whether a page is executable and a column 718 indicating whether a page table entry is valid. Similarly, page table 725 maps pages 720 used by process $P_1$ to pages in physical memory 730. The process $P_1$ includes a single page of executable instructions (page 1) and three data pages (pages 1, 2 and 3). Page table 725 maps the virtual memory addresses used by process $P_1$ into addresses of physical memory 730. As shown, pages 0, 1, 2 and 3 are mapped into pages 0, 2, 5 and 6, respectively, of physical memory 730.

FIG. 7B illustrates the state of the compute node 110 of FIG. 7A after receiving a message from the control system 208 to prepare to execute process $P_0$ a second time. In response, the compute node 110 has discarded certain entries from page table 715, and changed the values of others. For example, the compute node 110 may modify page table 715 according to the method 600 shown in FIG. 6. As shown, the page table 725 for process $P_1$ has been discarded. Because the compute node 110 is going to execute $P_0$ again, however, page table 715 has been retained. The entries in page table 715 continue to map pages 0, 1, and 3 from virtual memory space 710 into physical memory 735 pages 1, 4, and 7, respectively. The page table entry for virtual memory page 2 however, is removed. As shown, the page table 715 now shows the entry for page 2 is invalid. Additionally, the values shown present in physical memory 735 at page 3, where this page was mapped during the prior invocation of process $P_0$ is shown having been set to null. When the program $P_0$ is executed an additional time, page faults for page 0, 1 and 3 will not occur.

Embodiments of the invention may be used to reduce the time required to load a program for execution in a distributed or highly parallelized computer system. This is accomplished by reusing certain page table entries created during a previous invocation of the program at a particular compute node. Thus, as a whole, the number of pages that must be paged into the memory of the compute node is reduced, thereby reducing program load time. In both massively parallel systems and distributed or clustered systems, where the same job may be executed many times, the improvement to overall system performance may be substantial, even where the improvement at the individual compute node may be relatively minimal.

While the foregoing is directed to embodiments of the present invention, other and further embodiments of the invention may be devised without departing from the basic scope thereof, and the scope thereof is determined by the claims that follow.

What is claimed is:

1. A method of loading a program on a computing system that includes multiple processing nodes, comprising:
   identifying, if available, a plurality of processing nodes that previously executed the program, wherein the program is associated with a computing job submitted for execution by the computing system;
   messaging each identified processing node to retain a page table associated with the previous execution of the program; and
   dispatching the computing job to the plurality of processing nodes.

2. The method of claim 1, further comprising recording an indication of the plurality of compute nodes to which the computing job is dispatched.

3. The method of claim 1, wherein each processing node includes at least a CPU and a memory.

4. The method of claim 1, wherein the computing system comprises a parallel computing system.

5. The method of claim 1, wherein the computing system comprises a distributed computing system.

6. The method of claim 1, wherein if the plurality of processing node that last executed the program are not available, dispatching the computing job for execution on the computing system, and recording an indication of which processing node to which the computing job is dispatched.

7. The method of claim 1, further comprising, in response to receiving the message to retain the page table associated with the previous execution of the program:
   identifying the page table associated with the program; and
   for each page table entry, determining whether the page table entry references a sequence of executable instructions associated with the program:
      if the page table entry references a sequence of executable instructions, retaining the entry in the page table; and
      if the page table entry does not reference a sequence of executable instructions, discarding the entry from the page table.

8. The method of claim 7, further comprising erasing content of physical memory addresses memory mapped to by a discarded page table entry.

* * * * *